(12) United States Patent
Sakaguchi et al.

(10) Patent No.: US 10,407,097 B2
(45) Date of Patent: Sep. 10, 2019

(54) AUTOMATIC TRAVELING WORK VEHICLE, STEERING CONTROLLER FOR AUTOMATIC TRAVELING WORK VEHICLE, AND STEERING CONTROL METHOD FOR AUTOMATIC TRAVELING WORK VEHICLE

(71) Applicant: Kubota Corporation, Osaka-shi (JP)

(72) Inventors: Kazuo Sakaguchi, Amagasaki (JP); Kotaro Yamaguchi, Amagasaki (JP); Hiroki Suga, Amagasaki (JP); Atsushi Shinkai, Sakai (JP)

(73) Assignee: KUBOTA CORPORATION, Osaka-shi (JP)

( * ) Notice: Subject to any disclaimer, the term of this patent is extended or adjusted under 35 U.S.C. 154(b) by 0 days.

(21) Appl. No.: 15/841,296

(22) Filed: Dec. 14, 2017

(65) Prior Publication Data

US 2018/0208242 A1 Jul. 26, 2018

(30) Foreign Application Priority Data

Jan. 20, 2017 (JP) .................................. 2017-008340

(51) Int. Cl.
*B62D 15/02* (2006.01)
*B62D 6/00* (2006.01)
*G05D 1/02* (2006.01)
*A01B 69/04* (2006.01)

(52) U.S. Cl.
CPC .......... *B62D 15/025* (2013.01); *A01B 69/008* (2013.01); *B62D 6/001* (2013.01);
(Continued)

(58) Field of Classification Search
CPC ..... A01B 69/00; A01B 69/006; A01B 69/008; B62D 15/025; B62D 6/00; B62D 6/001;
(Continued)

(56) References Cited

U.S. PATENT DOCUMENTS 9,840,277 B1 * 12/2017 Beech .................... B62D 13/02
2007/0250234 A1 * 10/2007 Ito ........................ B62D 5/0463
701/41

(Continued)

FOREIGN PATENT DOCUMENTS

JP 2016-010336 1/2016

OTHER PUBLICATIONS

Extended European Search Report for corresponding EP Application No. 17206861.1-1006, dated Mar. 6, 2018.

*Primary Examiner* — Thomas G Black
*Assistant Examiner* — Ce Li Li
(74) *Attorney, Agent, or Firm* — Mori & Ward, LLP (57) ABSTRACT

An automatic traveling work vehicle includes a memory to store work traveling information including information on work which a work device is configured to perform and on a state of a work field in which the automatic traveling work vehicle is configured to automatically travel along a target travel route. Circuitry is configured to calculate a vehicle position of the automatic traveling work vehicle, to calculate a track deviation of a vehicle body from the target travel route based on the target travel route and the vehicle position, to calculate a steering sensitivity based on at least one of the information on the work and the information on the state of the work field, and to calculate, based on the track deviation and the steering sensitivity, a steering control amount according to which the steering is controlled.

10 Claims, 3 Drawing Sheets

(52) U.S. Cl.
CPC ........... *G05D 1/027* (2013.01); *G05D 1/0212* (2013.01); *G05D 1/0278* (2013.01); *G05D 2201/0201* (2013.01)

(58) Field of Classification Search
CPC .... G01S 19/13; G05D 1/0212; G05D 1/0217; G05D 1/0221; G05D 1/0257; G05D 1/027; G05D 1/0278; G05D 2201/0201; Y02A 40/12
See application file for complete search history.

(56) References Cited

U.S. PATENT DOCUMENTS

| | | | |
|---|---|---|---|
| 2009/0326763 A1* | 12/2009 | Rekow | A01B 69/006 701/42 |
| 2010/0152943 A1* | 6/2010 | Matthews | A01B 69/003 701/25 |
| 2013/0304300 A1* | 11/2013 | Peake | B62D 15/025 701/23 |
| 2014/0180543 A1* | 6/2014 | Ueda | B62D 1/28 701/41 |
| 2016/0037707 A1* | 2/2016 | Bebernes | A01B 69/007 180/6.48 |
| 2016/0039452 A1* | 2/2016 | Rotole | B62D 5/09 180/414 |
| 2016/0039453 A1* | 2/2016 | Bebernes | A01B 69/008 701/41 |
| 2016/0147225 A1* | 5/2016 | Sights | G05D 1/0088 701/23 |
| 2017/0197656 A1* | 7/2017 | Oh | B60R 1/00 |
| 2018/0362076 A1* | 12/2018 | Rowell | B62D 6/04 |

\* cited by examiner

AUTOMATIC TRAVELING WORK VEHICLE, STEERING CONTROLLER FOR AUTOMATIC TRAVELING WORK VEHICLE, AND STEERING CONTROL METHOD FOR AUTOMATIC TRAVELING WORK VEHICLE

CROSS-REFERENCE TO RELATED APPLICATIONS

The present application claims priority under 35 U.S.C. § 119 to Japanese Patent Application No. 2017-008340, filed Jan. 20, 2017. The contents of this application are incorporated herein by reference in their entirety.

BACKGROUND OF THE INVENTION

Field of the Invention

The present invention relates to an automatic traveling work vehicle, a steering controller for an automatic traveling work vehicle, and a steering method for an automatic traveling work vehicle.

Discussion of the Background

In the automatic traveling work vehicle, a deviation between a calculated own vehicle position and the target travel route is obtained, a control amount is calculated so as to eliminate the deviation, and a steering mechanism is controlled based on the control amount. For a work vehicle that performs the work traveling, sometimes expected steering control may not be performed depending on a state of the work field, a state of the work vehicle, and a work type.

For this reason, in order to obtain appropriate steering performance at both a high speed and a low speed, a field work machine disclosed in Japanese Patent Application Laid-open No. 2016-010336 includes a control function of degrading steering responsiveness for the high traveling speed and of improving steering responsiveness for the low traveling speed. Additionally, the field work machine includes a control function of improving the steering responsiveness such that stable steering is obtained even in the irregular field when an amount of vertical variation of a traveling machine body is larger than a predetermined value.

SUMMARY OF THE INVENTION

According to one aspect of the present invention, an automatic traveling work vehicle includes a vehicle body, a steering, a memory, and circuitry. A work device is configured to be connected to the vehicle body. The steering is to change a traveling direction of the automatic traveling work vehicle. The memory is to store work traveling information including information on work which the work device is configured to perform and on a state of a work field in which the automatic traveling work vehicle is configured to automatically travel along a target travel route. The circuitry is configured to calculate a vehicle position of the automatic traveling work vehicle, to calculate a track deviation of the vehicle body from the target travel route based on the target travel route and the vehicle position, to calculate a steering sensitivity based on at least one of the information on the work and the information on the state of the work field, and to calculate, based on the track deviation and the steering sensitivity, a steering control amount according to which the steering is controlled.

According to another aspect of the present invention, a steering controller for an automatic traveling work vehicle includes a memory and circuitry. The memory is to store work traveling information including information on work which a work device attached to the automatic traveling work vehicle is configured to perform and on a state of a work field in which the automatic traveling work vehicle is configured to automatically travel along a target travel route. The circuitry is configured to calculate a vehicle position of the automatic traveling work vehicle, to calculate a track deviation of the automatic traveling work vehicle from the target travel route and the vehicle position, to calculate a steering sensitivity based on at least one of the information on the work and information on the state of the work field, and to calculate, based on the track deviation and the steering sensitivity, a steering control amount according to which a steering of the automatic traveling work vehicle is controlled.

According to further aspect of the present invention, a steering control method for an automatic traveling work vehicle includes calculating a vehicle position of the automatic traveling work vehicle. A track deviation of the automatic traveling work vehicle is calculated from the vehicle position and a target travel route along which the automatic traveling work vehicle is configured to automatically travel in a work field. A steering sensitivity is calculated based on at least one of information on a state of the work field and information on work which a work device attached to the automatic traveling work vehicle is configured to perform. A steering control amount according to which a steering of the automatic traveling work vehicle is controlled is calculated based on the track deviation and the steering sensitivity.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
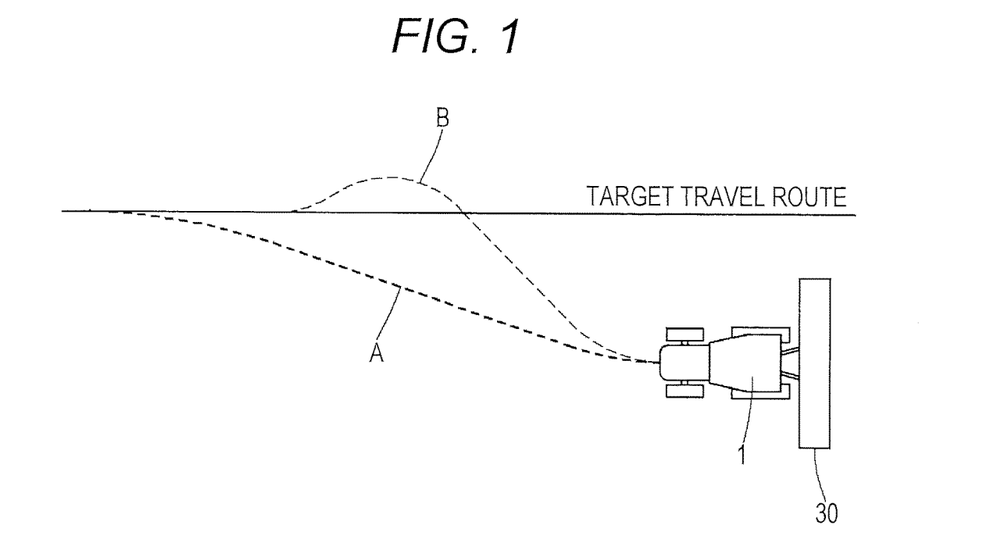
FIG. 1 is an explanatory diagram illustrating an example of a travel locus eliminating track deviation of an automatic traveling work vehicle that performs work traveling along a travel route.

An automatic traveling work vehicle according to an exemplary embodiment of the present invention will be described below with reference to the drawings. FIG. 1 illustrates a travel locus eliminating a track deviation that is generated when a tractor, which is an automatic traveling work vehicle in which a vehicle body 1 is equipped with a work device 30, automatically travels in the field (work field) along a travel route. When the tractor deviates from the travel route that is a target of the automatic traveling, steering control is performed such that the tractor returns to the travel route again. At this point, different traveling loci appear depending on steering sensitivity that is used to calculate a control amount in order to restore the track deviation based on a control input value indicating the track deviation. FIG. 1 illustrates an example in which the tractor returns to the target travel route with a gentle track deviation eliminated travel locus (indicated by a long dotted line in FIG. 1 and denoted by the reference sign A) generated as a result of the low steering sensitivity and an example in which the tractor returns to the target travel route with a suddenly changing track deviation eliminated travel locus (indicated by a short dotted line in FIG. 1 and denoted by the reference sign B) generated as a result of the high steering sensitivity. In the embodiment of the present invention, the steering sensitivity is set such that the track deviation eliminated travel locus is appropriately obtained according to a state of the work field and a work type, thereby achieving appropriate steering control.

Figure 2:
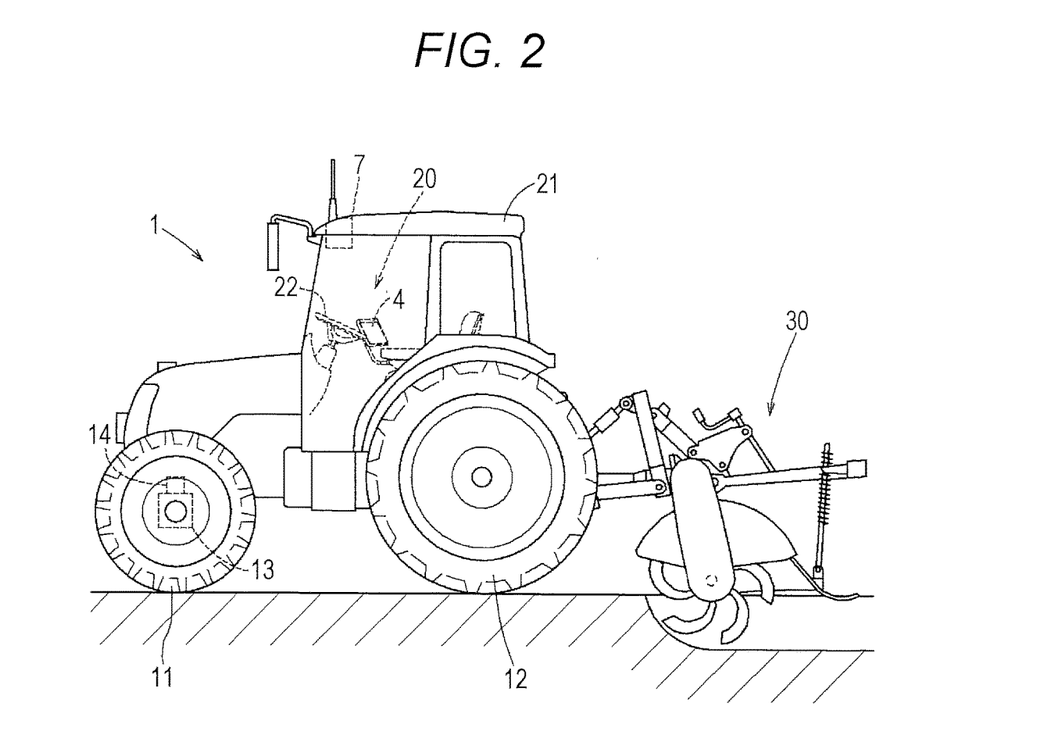
FIG. 2 is a side view of a tractor that is an example of the automatic traveling work vehicle.

As illustrated in FIG. 2, the tractor is provided with a driver's cab 20 in a central portion of the vehicle body 1 supported by front wheels 11 and rear wheels 12. The work device 30, which is a rotary tilling device, is mounted on a rear portion of the vehicle body 1 with a hydraulic lifting mechanism interposed therebetween. The front wheels 11 act as a steering wheel, and the traveling direction of the tractor is changed by changing the steering angle of the steering wheel. The steering angle of the front wheel 11 is changed by operation of a steering mechanism 13. The steering mechanism (steering) 13 includes a steering motor 14 for automatic steering. In manual traveling, the steering of the front wheels 11 is performed by operation of the steering wheel 22 disposed in the driver's cab 20. A satellite positioning module 7 is provided in a cabin 21 of the tractor as a positioning module. A satellite antenna for receiving a global navigation satellite system (GNSS) signal (including a GPS signal) is attached at a ceiling area of the cabin 21 as a component of the satellite positioning module 7. The satellite positioning module 7 can include an inertial navigation module in which a gyroscope acceleration sensor and a magnetic direction sensor are incorporated in order to complement satellite navigation. The inertial navigation module may be provided separately from the satellite positioning module 7.

Figure 3:
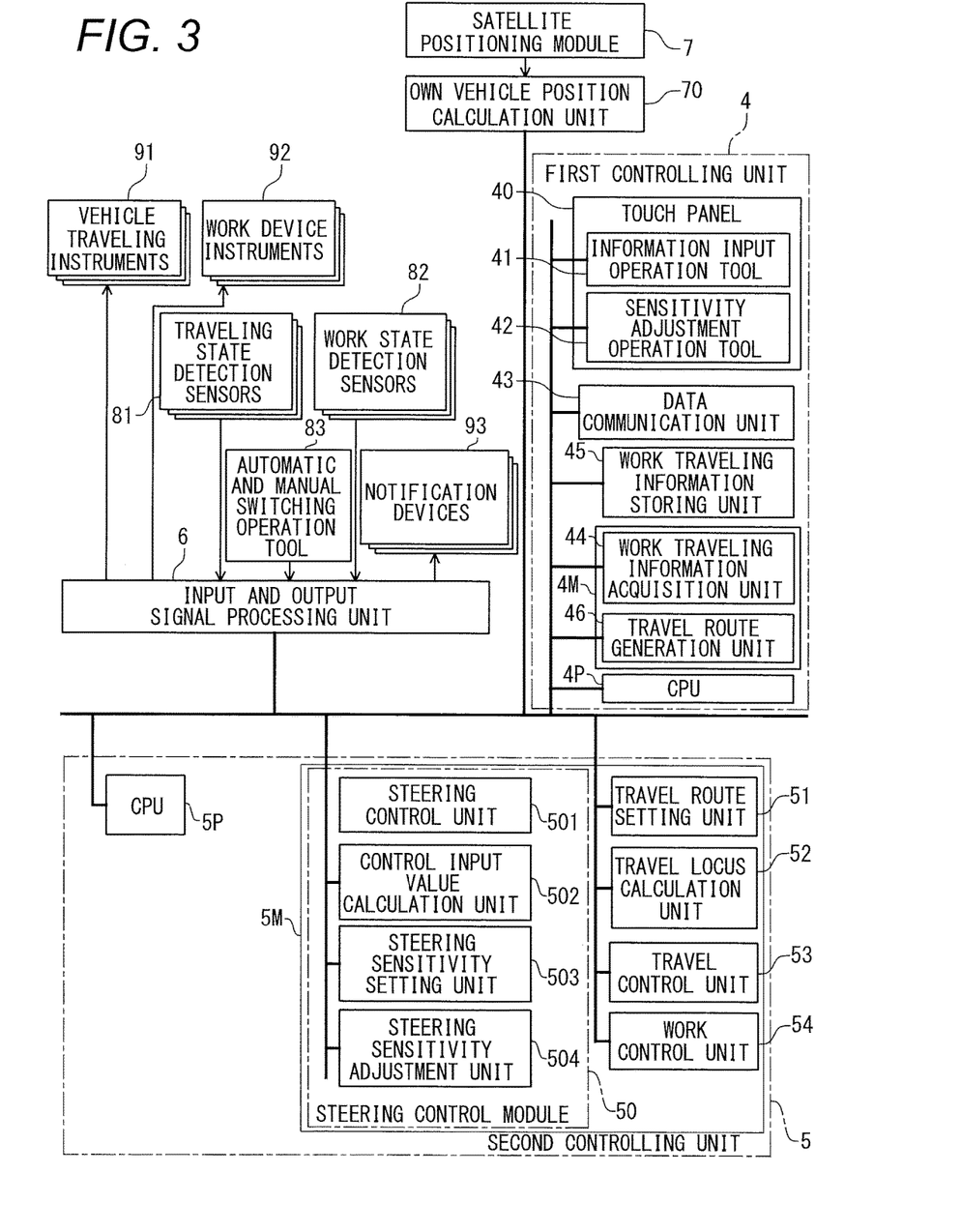
FIG. 3 illustrates a structure of the tractor.

FIG. 3 illustrates a control system constructed in the tractor. The control system of the exemplary embodiment includes a first controlling unit 4 that is a general-purpose terminal including a graphical user interface, a second controlling unit 5 that controls the tractor, and an input and output signal processing unit 6 that performs data conversion. The first controlling unit 4, the second controlling unit 5, and the input and output signal processing unit 6 are connected to one another through an in-vehicle LAN or a control signal line.

The input and output signal processing unit 6 functioning as an input and output interface has a function of connecting a data and signal line, an in-vehicle LAN, a wireless communication line, and a wired communication line. Vehicle traveling instruments 91, work device instruments 92, a notification device 93, traveling state detection sensors 81, work state detection sensors 82 are connected to the first controlling unit 4 and the second controlling unit 5 through the input and output signal processing unit 6. Therefore, the input and output signal processing unit 6 has an output signal processing function, an input signal processing function, a communication function of exchanging data through the wireless line or wired line of the data and signal line, and the like. The vehicle traveling instruments 91 includes the steering motor 14 of the steering mechanism 13, an engine control device, and a gear shift operation device. The work device instruments 92 include a power transmission clutch of the tilling device which that is the work device 30 and a lifting cylinder of the lifting mechanism. The notification device 93 includes a meter, a buzzer, lamps, and a liquid crystal display. Switches and buttons such as the traveling state detection sensors 81, the work state detection sensors 82, and an automatic and manual switching operation tool 83 are also connected to the input and output signal processing unit 6.

Positioning data from the satellite positioning module 7 is processed by an own vehicle position calculation unit (vehicle position calculation circuitry) 70, and a position in a map coordinate or a field coordinate of a predetermined point of the tractor is output as an own vehicle position.

In the exemplary embodiment, the first controlling unit 4 is configured as a general-purpose terminal. The first controlling unit 4 includes a touch panel 40 and a data communication unit 43. The first controlling unit 4 further includes a work traveling information acquisition unit 44, a work traveling information storing unit 45, and a travel route generation unit 46. Specifically, the first controlling unit 4 includes a CPU (circuitry) 4P and a memory 4M. Programs of the work traveling information acquisition unit 44 and the travel route generation unit 46 are stored in the memory 4M and executed by the CPU 4P to perform functions thereof, respectively. Because the touch panel 40 is disposed in the driver's cab 20, the touch panel 40 provides various pieces of information to a user using a display unit, and receives input operation of the user. A user operation tool constructed by software is displayed on the touch panel 40, and particularly an information input operation tool 41 and a sensitivity adjustment operation tool 42 are cited as a user operation button related to the embodiment of the present invention.

The work traveling information acquisition unit 44 acquires work traveling information including the state of the work field and the work type from an external computer or a storage medium through the data communication unit 43. The state of the work field means quality such as slipperiness and hardness in the traveling surface of the work field. The work types of the work device 30 means fertilization work, scraping work, seedling planting work, harvesting work, weeding work, cultivating work, and the like. When the first controlling unit 4 has a function of producing a work plan of the field using the touch panel 40, the work traveling information acquisition unit 44 can acquire the state of the work field and the work type from the produced work plan. The work traveling information storing unit 45 stores the state of the work field and the work type, which are included in the work traveling information, in a memory. Accordingly, the work traveling information storing unit 45 includes the memory. The user can directly input the state of the work field and the work type using the information input operation tool 41 displayed on the touch panel 40.

The travel route generation unit 46 refers to the field information including a landform of the field to be worked, and generates the travel route using a previously-installed travel route generation program.

The second controlling unit 5 includes a travel route setting unit 51, a steering control module 50, a travel control unit 53, and a work control unit 54 as basic control function unit for the automatic work traveling of the tractor. More specifically, the second controlling unit 5 includes a CPU (circuitry) 5P and a memory 5M. Programs of the travel route setting unit 51, the steering control module 50, the travel control unit 53, and the work control unit 54 are stored in the memory 5M and executed by the CPU 5P to perform functions thereof, respectively.

The travel route setting unit 51 takes in the travel route generated by the travel route generation unit 46, and readably develops the travel route in a memory such that the travel route can be set as a traveling target route for automatic traveling. The steering control module 50 has an automatic steering control mode and a manual steering control mode. When the automatic steering control mode is selected, based on the target travel route and the own vehicle position, the steering control module 50 outputs an operation control signal to the steering motor 14 of the steering mechanism 13 such that the vehicle body 1 travels along the target travel route as described in detail later. When the manual steering control mode is selected, the steering control module 50 outputs the operation control signal to the steering motor 14 based on the operation of the steering wheel 22 by the driver.

The travel control unit 53 has an automatic traveling control mode and a manual traveling control mode. When the automatic traveling control mode is selected, the travel control unit 53 provides a control signal to the vehicle traveling instruments 91 based on a previously-set automatic traveling parameter, and causes the vehicle body 1 to travel with an engine speed and a vehicle speed, which are regulated by the automatic traveling parameter. When the manual traveling control mode is selected, the control signal is provided to the vehicle traveling instruments 91 based on the operation of an accelerator pedal or a gear shift lever by the driver. The work control unit 54 has an automatic work control mode and a manual work control mode. When the automatic work control mode is selected, a signal is provided to the work device instruments 92 based on the automatic work parameter, thereby performing maintenance of an orientation of the work device 30 and the lifting of the work device 30, which are regulated by the automatic traveling parameter. When the manual operation control mode is selected, the control signal is provided to the work device instruments 92 based on the operation of the work operation tool by the driver.

Figure 4:
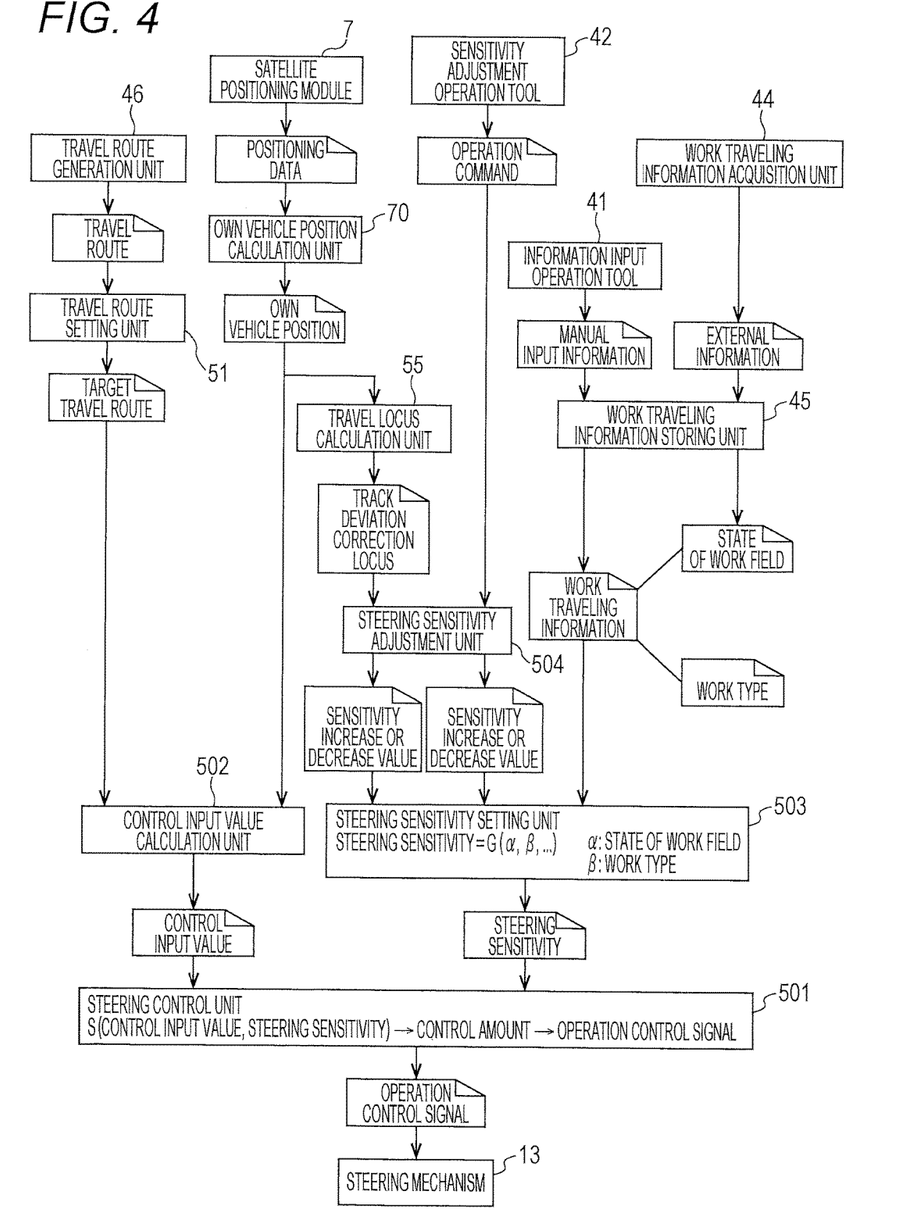
FIG. 4 is an explanatory diagram illustrating a flow of steering control.

As illustrated in FIGS. 3 and 4, in the automatic steering control mode, the steering control module 50 calculates a control amount for the steering motor 14 in order to eliminate the track deviation between the target travel route and the own vehicle position, and the steering sensitivity depending on the state of the work field and the work type of the work device 30 is applied to the calculation. Therefore, the steering control module 50 includes a steering control unit 501, a control input value calculation unit 502, a steering sensitivity setting unit 503, and a steering sensitivity adjustment unit 504.

The steering control unit 501 calculates a control amount controlling the steering motor 14 of the steering mechanism 13 based on the control input value calculated by the control input value calculation unit 502 and the steering sensitivity set by the steering sensitivity setting unit 503. The calculated control amount is converted into an operation control signal driving the steering motor 14, and transmitted to the steering mechanism 13.

Based on the target travel route set by the travel route setting unit 51 and the own vehicle position calculated by the own vehicle position calculation unit 70, the control input value calculation unit 502 calculates the track deviation that is a deviation of the vehicle body 1 with respect to the target travel route, and calculates a control input value based on the calculated track deviation. At this point, the control input value is calculated while a positional deviation that is a deviation between the own vehicle position and the target position in the target travel route and an azimuth deviation that is a deviation between a traveling azimuth of the vehicle body 1 and an azimuth of the target travel route are distinguished from each other. However, the control input value may be calculated only from the positional deviation.

The steering sensitivity setting unit 503 derives the steering sensitivity from a combination of the state of the work field and the work type, which are read from the work traveling information, and sets the steering sensitivity such that the steering sensitivity is used in the steering control unit 501. Therefore, the steering sensitivity setting unit 503 includes a two-dimensional table G ($\alpha$, $\beta$) in which the steering sensitivity previously obtained by a combination of various states ($\alpha$: $\alpha 1$, $\alpha 2$, . . . ) of the work field and various work types ($\beta$: $\beta 1$, $\beta 2$, . . . ) is stored. The appropriate steering sensitivity is derived by providing the state of the specific work field and the work type to the table. A table of at least three dimensions in which elements other than the state of the work field and the work type are introduced can be constructed instead of the two-dimensional table.

The steering sensitivity adjustment unit 504 generates a sensitivity adjustment command to increase or decrease the steering sensitivity set by the steering sensitivity setting unit 503. The sensitivity adjustment command includes a steering sensitivity increase and decrease value.

When a travel locus that is achieved with the steering sensitivity set by the steering sensitivity setting unit 503 to eliminate the track deviation is not satisfied, the user can directly increase or decrease the steering sensitivity. In this case, the sensitivity adjustment operation tool 42 displayed on the touch panel 40 can be used in the exemplary embodiment. When the user operates the sensitivity adjustment operation tool 42 configured by a slider system for example, the operation command to increase or decrease the steering sensitivity is issued to the steering sensitivity adjustment unit 504. The steering sensitivity adjustment unit 504 generates a sensitivity increase and decrease value based on the operation command, and provides the sensitivity increase and decrease value to the steering sensitivity setting unit 503. Therefore, the set steering sensitivity increases or decreases according to a user's intention.

A travel locus calculation unit 52 to calculate from sequential own vehicle positions the track deviation eliminated travel locus in which the track deviation is eliminated is included in the exemplary embodiment in order to automatically adjust the steering sensitivity. A program of the travel locus calculation unit 52 are stored in the memory 5M and executed by the CPU 5P to perform a function of the travel locus calculation unit 52. When the automatic steering sensitivity adjustment mode is set, the steering sensitivity adjustment unit 504 compares the track deviation eliminated travel locus provided from the travel locus calculation unit 52 with an ideal locus of the track deviation eliminated travel locus. The ideal locus of the track deviation eliminated travel locus is previously obtained by the state of the specific work field and the work type and stored, and derived based on the work traveling information (the state of the work field and the work type) stored in the work traveling information storing unit 45. A sensitivity increase and decrease value necessary to bring the actually-realized track deviation eliminated travel locus close to the ideal locus is calculated based on a comparison result, and the sensitivity increase and decrease value is provided to the steering sensitivity setting unit 503. Therefore, degradation of the track deviation eliminated travel locus due to an external cause related to the environmental change of the work field and an internal cause related to a performance change of the tractor including the work device 30 can automatically be eliminated.

According to the embodiment of the present invention, an automatic traveling work vehicle to perform work traveling along a target travel route in a work field includes: a vehicle body to be equipped with a work device; a work traveling information storing unit to store work traveling information including a state of the work field and a work type of the work device; a steering mechanism to change a traveling direction of the vehicle body; an own vehicle position calculation unit to calculate an own vehicle position based on positioning data from a positioning module; a travel route setting unit to set the target travel route; a control input value calculation unit to calculate a track deviation that is a deviation of the vehicle body from the target travel route based on the target travel route and the own vehicle position and to calculate a control input value based on the track deviation; a steering control unit to calculate a control amount in which the steering mechanism is controlled based on the control input value and steering sensitivity; and a steering sensitivity setting unit to derive the steering sensitivity from the state of the work field read from the work traveling information, the work type read from the work traveling information, or a combination of the state of the work field and the work type to set the steering sensitivity derived.

The term of "work traveling" used in the embodiment of the present invention includes performing the work during the traveling, only traveling, only performing the work, performing at least one of the items, and a pause of the work traveling.

According to the configuration, in the case that the vehicle body deviates from the target travel route, variable steering sensitivity is used when the control amount to be provided to the steering mechanism is calculated to eliminate the track deviation with the control input value based on the track deviation as input. Because the steering sensitivity is derived from the state of the work field, the work type of the work performed in the work field, or the combination of the state of the work field and the work type, the control amount as a calculation result has a value in which either the state of the work field or the work type or both the state of the work field and the work type are considered. The steering sensitivity can previously be set so as to be suitable for a specific work type in a specific work field where the work traveling is performed. Therefore, in a work type in which desirably the vehicle body is returned to the target travel route with a gentle travel locus, the control amount suitable for this work type is outputted, and in a work type in which desirably the vehicle body is returned to the target travel route with a suddenly changing travel locus, a control amount suitable for this work type is outputted.

In an advantageous exemplary embodiment of the present invention, the automatic traveling work vehicle further includes a work traveling information acquisition unit to acquire the work traveling information from an outside through communication to provide the work traveling information to the work traveling information storing unit. In the configuration, a disadvantage that false work traveling information is provided to the work traveling information storing unit due to an operation error and a disadvantage that the previously-stored work traveling information is directly used are avoided because the work traveling information is directly transmitted from the outside, for example, a computer of an agricultural management center or a computer of a farmer to the automatic traveling work vehicle.

In an advantageous exemplary embodiment of the present invention, the automatic traveling work vehicle further includes a sensitivity adjustment operation tool to be operated by a user to send to the steering sensitivity setting unit a command to increase or decrease the steering sensitivity. In the configuration, when a supervisor who supervises the work traveling of the automatic traveling work vehicle feels the disadvantage in the locus until the vehicle body deviating from the target travel route is returned to the target travel route, the supervisor can directly adjust the steering sensitivity to obtain the proper locus. Therefore, the automatic work traveling can be performed with the optimum steering sensitivity for the work field and work type.

In an advantageous exemplary embodiment of the present invention, the automatic traveling work vehicle further includes: a travel locus calculation unit to calculate from sequential own vehicle positions a track deviation eliminated travel locus in which the track deviation is to be eliminated; and a steering sensitivity adjustment unit to compare the track deviation eliminated travel locus with an ideal locus of the track deviation eliminated travel locus derived from the work traveling information to send to the steering sensitivity setting unit a command to increase or decrease the steering sensitivity. In the configuration, the ideal locus is compared with the track deviation eliminated travel locus as a result of the steering control eliminating actual track deviation, whereby the track deviation eliminated travel locus closer to the ideal locus is achieved during the next track deviation. Therefore, it is possible to automatically approach the optimum steering control without labor of the user.

Other Exemplary Embodiments (1) In the above exemplary embodiment, the steering sensitivity setting unit 503 adopts the configuration in which the steering sensitivity is derived from the combination of the state of the work field and the work type, which are read from the work traveling information. Alternatively, the steering sensitivity setting unit 503 may adopt a configuration in which the steering sensitivity is derived only from the state of the work field or the work type. At this point, a mode of deriving the steering sensitivity from the combination of the state of the work field and the work type, a mode of deriving the steering sensitivity only from the state of the work field, and a mode of deriving the steering sensitivity only from the work type may be included, and arbitrarily selected.

(2) In the above exemplary embodiment, the first controlling unit 4 is the general-purpose terminal in which the driver's cab 20 is disposed. When the general-purpose terminal is constructed with a tablet computer or the like, a driver or a manager brings the general-purpose terminal out of the vehicle, and the general-purpose terminal can exchange data with the control system of the tractor using wireless communication instead of the in-vehicle LAN. For example, the steering sensitivity can be adjusted from the outside of the vehicle.

(3) In the above exemplary embodiment, the information input operation tool 41 and the sensitivity adjustment operation tool 42 are configured as software operation tools displayed on the touch panel 40. Alternatively, the information input operation tool 41 and the sensitivity adjustment operation tool 42 may be provided in the driver's cab 20 as a hardware operation tool.

(4) The division of each functional unit in the functional block diagram in FIG. 3 is an example for the purpose of easy understanding. Various functional units may be integrated, or a single functional unit may be divided into a plurality of functional units. Specifically, the vehicle position calculation circuitry 70 and the CPUs 4P and 5P can be integrated into a single or dual CPU or divided into more than four CPUs. The memories 4M and 5M and the work traveling information storing unit 45 can be integrated into a single memory or divided into memories in a different configuration.

(5) In the above exemplary embodiment, the tractor equipped with the tilling device as the work device 30 is described as the work vehicle. However, the embodiment of the present invention is also applicable to a tractor equipped with the work device 30 other than the tilling device, and further an agricultural work machine such as a combine and a rice transplanter and a construction machine, for example.

INDUSTRIAL APPLICABILITY

The present invention can be applied to an automatic traveling work vehicle that performs the work traveling along the travel route.

Obviously, numerous modifications and variations of the present invention are possible in light of the above teachings. It is therefore to be understood that within the scope of the appended claims, the invention may be practiced otherwise than as specifically described herein.

What is claimed is:

1. An automatic traveling work vehicle comprising:
   a vehicle body to which a work device is configured to be connected;
   a steering to change a traveling direction of the automatic traveling work vehicle;
   a detector to detect an operation amount of a sensitivity adjustment operation tool to be operated by a user;
   a memory to store work traveling information including information on work which the work device is configured to perform and on a state of a work field in which the automatic traveling work vehicle is configured to automatically travel along a target travel route; and
   circuitry configured to
      calculate a vehicle position of the automatic traveling work vehicle,
      calculate a track deviation of the vehicle body from the target travel route based on the target travel route and the vehicle position,
      calculate a steering sensitivity based on at least one of the information on the work and the information on the state of the work field, the steering sensitivity indicating a steering amount based on which the work vehicle is to travel to return to the target travel route from the vehicle position that deviates from the target travel route by the track deviation,
      calculate an adjustment value of the steering sensitivity based on the operation amount of the sensitivity adjustment operation tool,
      add the adjustment value to the steering sensitivity to obtain an adjusted steering sensitivity, and
      calculate, based on the track deviation and the adjusted steering sensitivity, a steering control amount according to which the steering is controlled.

2. The automatic traveling work vehicle according to claim 1, wherein the circuitry is further configured to receive the work traveling information through communication to provide the work traveling information to the memory.

3. The automatic traveling work vehicle according to claim 1,
   wherein the sensitivity adjustment operation tool is configured to be displayed in a touch panel in the automatic traveling work vehicle, and
   wherein the detector is the touch panel.

4. The automatic traveling work vehicle according to claim 1, wherein the circuitry is further configured to
   calculate from sequential vehicle positions of the automatic traveling work vehicle a track deviation eliminating travel locus via which the automatic traveling work vehicle travels to eliminate the track deviation, and
   compare the track deviation eliminating travel locus with an ideal locus to eliminate the track deviation which is derived from the work traveling information to send to the circuitry a command to increase or decrease the steering sensitivity.

5. The automatic traveling work vehicle according to claim 1, wherein the circuitry is configured to set the target travel route.

6. The automatic traveling work vehicle according to claim 1, wherein the circuitry configured to calculate the vehicle position of the automatic traveling work vehicle based on positioning data from a positioning module.

7. A steering controller for an automatic traveling work vehicle, comprising:
   a detector to detect an operation amount of a sensitivity adjustment operation tool to be operated by a user;
   a memory to store work traveling information including information on work which a work device attached to the automatic traveling work vehicle is configured to perform and on a state of a work field in which the automatic traveling work vehicle is configured to automatically travel along a target travel route; and
   circuitry configured to
      calculate a vehicle position of the automatic traveling work vehicle,
      calculate a track deviation of the automatic traveling work vehicle from the target travel route and the vehicle position,
      calculate a steering sensitivity based on at least one of the information on the work and information on the state of the work field, the steering sensitivity indicating a steering amount based on which the work vehicle is to travel to return to the target travel route from the vehicle position that deviates from the target travel route by the track deviation,
      calculate an adjustment value of the steering sensitivity based on the operation amount of the sensitivity adjustment operation tool,
      add the adjustment value to the steering sensitivity to obtain an adjusted steering sensitivity, and
      calculate, based on the track deviation and the adjusted steering sensitivity, a steering control amount according to which a steering of the automatic traveling work vehicle is controlled.

8. The steering controller according to claim 7,
   wherein the sensitivity adjustment operation tool is configured to be displayed in a touch panel in the automatic traveling work vehicle, and
   wherein the detector is the touch panel.

9. A steering control method for an automatic traveling work vehicle, comprising:
   detecting an operation amount of a sensitivity adjustment operation tool to be operated by a user;

calculating a vehicle position of the automatic traveling work vehicle;

calculating a track deviation of the automatic traveling work vehicle from the vehicle position and a target travel route along which the automatic traveling work vehicle is configured to automatically travel in a work field;

calculating a steering sensitivity based on at least one of information on a state of the work field and information on work which a work device attached to the automatic traveling work vehicle is configured to perform, the steering sensitivity indicating a steering amount based on which the work vehicle is to travel to return to the target travel route from the vehicle position that deviates from the target travel route by the track deviation;

calculating an adjustment value of the steering sensitivity based on the operation amount of the sensitivity adjustment operation tool;

adding the adjustment value to the steering sensitivity to obtain an adjusted steering sensitivity; and calculating, based on the track deviation and the adjusted steering sensitivity, a steering control amount according to which a steering of the automatic traveling work vehicle is controlled.

10. The steering control method according to claim 9, wherein the sensitivity adjustment operation tool is configured to be displayed in a touch panel in the automatic traveling work vehicle, and wherein the detector is the touch panel.

* * * * *